US011272779B2

(12) United States Patent
Grinnell

(10) Patent No.: US 11,272,779 B2
(45) Date of Patent: Mar. 15, 2022

(54) MOUNT FOR AN ARTICLE OF WEAR

(71) Applicant: Axon Enterprise, Inc., Scottsdale, AZ (US)

(72) Inventor: Edward Grinnell, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 43 days.

(21) Appl. No.: 16/858,100

(22) Filed: Apr. 24, 2020

(65) Prior Publication Data
US 2020/0337448 A1 Oct. 29, 2020

Related U.S. Application Data

(60) Provisional application No. 62/839,319, filed on Apr. 26, 2019.

(51) Int. Cl.
*A45F 5/02* (2006.01)

(52) U.S. Cl.
CPC ........ *A45F 5/02* (2013.01); *A45F 2200/0533* (2013.01)

(58) Field of Classification Search
CPC ........... Y10T 24/44034; Y10T 24/3698; A45F 2200/0533; A45F 5/02; F16M 13/04; G03B 17/561; A41F 1/00
USPC ................................................ 224/194, 271
See application file for complete search history.

(56) References Cited

U.S. PATENT DOCUMENTS

| | | | | |
|---|---|---|---|---|
| 2,121,147 A | * | 6/1938 | Goodrich | ................... A41F 5/00 24/460 |
| 2,454,103 A | * | 11/1948 | Swidersky | ............. A44B 99/00 24/459 |
| 3,257,695 A | * | 6/1966 | Frame | ................ B65D 33/1616 24/30.5 P |
| 4,128,194 A | * | 12/1978 | Hinz | ...................... A45C 11/00 224/194 |
| 7,216,404 B1 | * | 5/2007 | Doyle | ....................... A45F 5/02 206/286 |
| 10,901,302 B2 | * | 1/2021 | Wine | ........................ A45F 5/02 |

(Continued)

FOREIGN PATENT DOCUMENTS

| | | |
|---|---|---|
| JP | 10133275 A | 5/1998 |
| JP | 11024162 A | 1/1999 |
| JP | 2000137263 A | 5/2000 |

OTHER PUBLICATIONS

International Searching Authority, International Search Report for International Patent Application No. PCT/US2020/029870 dated Aug. 14, 2020.

*Primary Examiner* — Adam J Waggenspack

(57) ABSTRACT

A mount for coupling to an article of wear comprises a back plate configured to engage a front plate over the article of wear. The back plate comprises a first structure and a second structure. The front plate comprises a base configured to receive an accessory, a slide slidably engaged with the base, and a swing rotatably engaged with the base. The base comprises a third structure and a first latch feature. The slide comprises a fourth structure and a first coupler. The swing comprises a second coupler and a second latch feature. The slide is configured to move to engage the third structure with the first structure and the fourth structure with the second structure. The swing is configured to rotate to engage the first coupler with the second coupler and the first latch feature with the second latch feature.

20 Claims, 6 Drawing Sheets

(56) References Cited

U.S. PATENT DOCUMENTS

| | | |
|---|---|---|
| 2014/0092299 A1* | 4/2014 | Phillips .................. F16M 11/14 |
| | | 348/376 |
| 2015/0229874 A1 | 8/2015 | Sandy |
| 2017/0284598 A1 | 10/2017 | Shimonishi |
| 2020/0245730 A1* | 8/2020 | Grinnell ............. A44B 17/0047 |

* cited by examiner

MOUNT FOR AN ARTICLE OF WEAR

CROSS-REFERENCE TO RELATED APPLICATIONS

This application claims priority to, and the benefit of, U.S. Provisional Patent Application No. 62/839,319, filed on Apr. 26, 2019, and entitled "MOUNTING APPARATUS FOR AN ARTICLE OF WEAR," which is herein incorporated by reference in its entirety.

FIELD OF INVENTION

Embodiments of the present invention relate to mounts that releasably mount to articles of wear.

BACKGROUND

Public safety personnel, such as police officers and firefighters use cameras to capture events, so that a video and/or audio record exist of what happened in an incident. These cameras may be mounted on vehicles such as cars and drones, and they may also be worn on the body as body worn cameras. Numerous mounting systems exist to mount cameras to personnel. These systems include a variety of coupling methods including those that utilize strong magnets, those that use adhesives, and those that use mechanical interlocks.

Some mounts relying on magnetism tend to require expensive neodymium rare earth magnets to provide high attractive forces. Additionally, while the strength of a magnetic solution may be great over thin clothing, the attractive force between magnets rapidly decreases as distance increases, roughly following an inversely proportional relationship to the distance squared. As two sides of a magnetic mount begin to separate, the attractive force quickly falls.

While adhesive mounts can be robust and versatile, environmental conditions such as cold temperatures, immersion in liquids, and exposure to various chemicals may lead to premature failure of the adhesive mount (e.g., unintentional decoupling of the adhesive mount). Additionally, adhesive mounts often rely on permanent adhesives that may damage uniforms upon removal.

Some mechanical interlock systems require alterations to the clothing of a user, which incurs additional resources and must be made on all articles of clothing on which a user plans to mount a camera. Other more versatile mechanical interlock systems do not require alterations to the clothing of a user. However, mechanical interlock systems that do not require alterations typically rely on coupling with mechanical features inherent to an article of clothing, such as hook and loop pads, modular lightweight load-carrying equipment (MOLLE) straps, and/or epaulets. Yet, these mounting features do not exist on all articles of clothing a user may wish to mount a device to.

BRIEF DESCRIPTION OF THE SEVERAL VIEWS OF THE DRAWING

Embodiments of the present invention will be described with reference to the drawing, wherein like designations denote like elements, and.

DETAILED DESCRIPTION

The detailed description of exemplary embodiments herein refers to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Additionally, any reference to without contact (or similar phrases) may also include reduced contact or minimal contact.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

Aspects of this disclosure relate to a mount configured to couple an accessory (e.g., camera, recording device, microphone, etc.) to an article of wear (e.g., clothing, jacket, uniform, hat, vest, gloves, pants, shoes, etc.). The mount may permanently or releasably couple to the accessory. The mount may permanently or releasably couple to the article of wear. Articles of wear may comprise various properties, such as thickness, texture, material (e.g., synthetic, natural, blend, etc.), texture, number of layers, and/or the like. The mount may be universal in nature, such that the mount may couple an accessory to articles of wear having different properties. For example, the mount may be configured to mount to a first article of wear having a first thickness, as well as a second article of wear having a second thickness different than the first thickness. In various embodiments, the mount may provide a means for an accessory to be worn on an article of wear, without needing to modify the article of wear.

Figure 1:
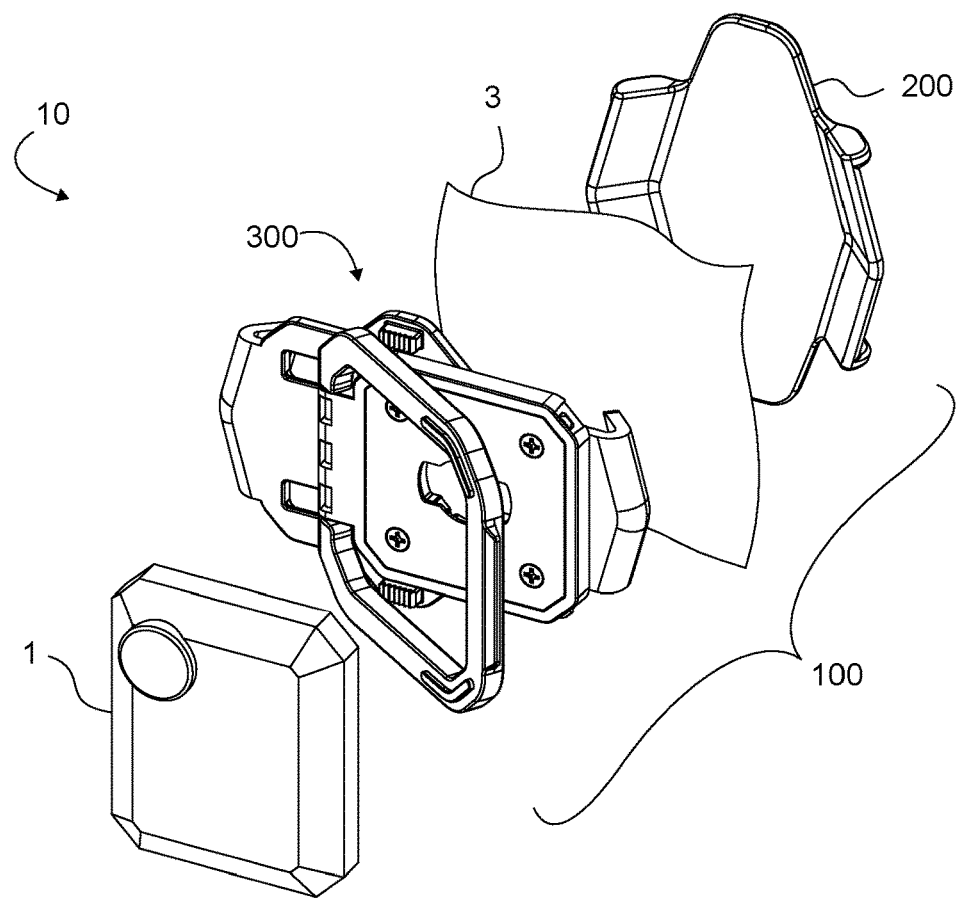
FIG. 1 is an exploded view showing an implementation of a mount system, according to one or more aspects described herein.

In various embodiments, and with reference to FIG. 1, a mount system, such as system 10, for coupling an accessory to an article of wear is disclosed. It should be understood by one skilled in the art that FIG. 1 is an example illustration of system 10. In the example of FIG. 1, system 10 may comprise a mount 100 and an accessory 1.

In various embodiments, one or more components of mount 100 may be formed of one or more rigid, durable materials able to withstand force(s) applied to mount 100 during use. For example, one or more components of mount 100 may include one or more rigid, plastic materials, metal materials, and/or composite materials. The one or more rigid materials may include corrosion-resistant materials, UV resistant materials, and/or any other suitable material configured to at least partially withstand environmental factors. Rigid materials may include metals and metallic alloys (e.g., aluminum, steel, titanium, etc.), composites (e.g., fiberglass, carbon fiber, etc.), plastics (e.g., polycarbonate, acrylonitrile butadiene styrene, polyether ether ketone, etc.), and/or the like. The rigid materials may also be treated (e.g., heat-treated, galvanized, anodized, etc.), painted (e.g., powder-coated, e-coated, etc.), and/or similarly modified to aid in withstanding environmental factors.

In various embodiments, mount 100 may comprise one or more components configured to releasably engage one another over an article of wear 3 (e.g., article, garment, carrier. etc.). Mount 100 may comprise various coupling features that enable mount 100 to releasably couple with one or more articles of wear 3. In various embodiments mount 100 may comprise a front plate 300 (e.g., front plate assembly, first plate, outside plate, receiving plate, etc.) and a back plate 200 (e.g., second plate, inside plate, etc.). Front plate 300 may be configured to engage back plate 200 over article of wear 3. In other words, article of wear 3 may be disposed between front plate 300 and back plate 200. One or more coupling features of front plate 300 may engage one or more coupling features of back plate 200 over one or more articles of wear. Front plate 300 may be positioned adjacent a first surface (e.g., outer surface, external surface, etc.) of article of wear 3. Back plate 200 may be positioned adjacent a second surface (e.g., inner surface, internal surface, etc.) of article of wear 3. The first surface of article of wear 3 may be opposite the second surface of article of wear 3. For example, front plate 300 may be disposed on an outer surface of article of wear 3 and back plate 200 may be disposed on an inner surface of article of wear 3. In this manner, mount 100 may be releasably mounted to article of wear 3 by engaging front plate 300 with back plate 200 over article of wear 3. Engagement of mount 100 with article of wear 3 may cause article of wear 3 to conform to various portions of mount 100. For example, article of wear 3 may fold, crease, compress, and/or the like. One or more structures of front plate 300 may interlock (e.g., cooperate, etc.) with one or more structures of back plate 200 to mount mount 100 to article of wear 3 as discussed further herein.

In various embodiments, mount 100 may be configured to engage an accessory 1. Accessory 1 may comprise a mountable device. In various embodiments, accessory 1 may comprise a recording device such as a body worn camera, microphone, and/or the like. In some embodiments, accessory 1 may be configured to permanently attach to front plate 300. For example, accessory 1 may couple with front plate 300 via permanent methods such as fasteners, welds, heat stakes, adhesives, and/or the like. In other embodiments, front plate 300 may be configured to releasably receive accessory 1. For example, front plate 300 may be configured to releasably receive accessory 1 via a coupler (e.g., joint), such as a coupler as disclosed in U.S. Pat. No. 9,756,930, which is herein incorporated by reference in its entirety. In various embodiments, it may be advantageous for front plate 300 to releasably receive accessory 1. For example, accessory 1 may be decoupled (e.g., disengaged, removed, etc.) from mount 100 while mount 100 remains coupled with article of wear 3. In this regard, mount 100 may remain on article of wear 3, while accessory 1 is removed (e.g., for charging, data transfer, maintenance, etc.). This may also be advantageous in that mount 100 may not need to be remounted to article of wear 3 when an accessory is removed. As another example, engagement of accessory 1 with front plate 300 may provide an additional means in securing mount 100 to article of wear 3. For example, coupling accessory 1 with front plate 300 may prevent front plate 300 from disengaging back plate 200 as described further herein.

Figure 2:
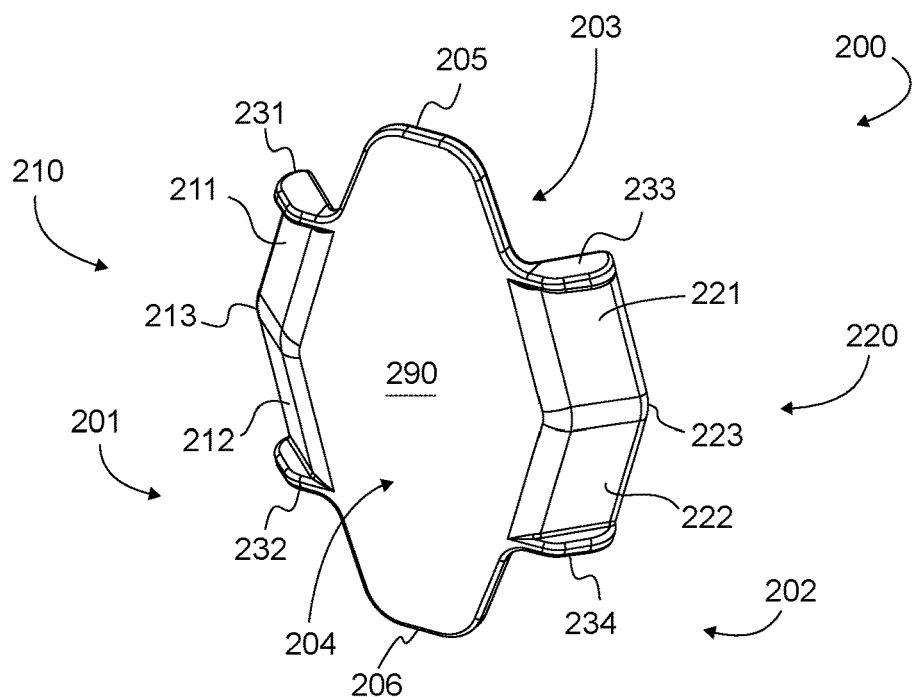
FIG. 2 is a rear perspective view showing an implementation of a back plate for a mount, according to one or more aspects described herein.

FIG. 2 shows a rear perspective view of a back plate, in accordance with various embodiments discussed herein. It should be understood by one skilled in the art that FIG. 2 is an example illustration of back plate 200, and one or more of the components of back plate 200 may be located in any suitable position within, or external to, back plate 200. In the example of FIG. 2, back plate 200 may comprise a unitary body. Alternatively, back plate 200 may be formed of multiple components that are assembled together. Back plate 200 may be molded, machined, forged, cast, additively manufactured, and/or the like. A shape, size, and/or thickness of back plate 200 may be configured to minimize an overall thickness of mount 100. Back plate 200 may comprise a generally flat portion, such as center back plate portion 290 (e.g., center back plate region, back plate center etc.). Back plate 200 may comprise a plurality of structures adjacent center back plate portion 290 and extending from center back plate portion 290. The plurality of structures may be configured to cooperate (e.g., engage, interlock, etc.) with one or more corresponding structures of a front plate over an article of wear, such as front plate 300 over article of wear 3. Back plate 200 may comprise one or more planes of symmetry. In the regard, back plate 200 may be reversible. In other words, back plate 200 may be configured to engage front plate 300 in multiple orientations.

Back plate 200 may include a first back plate surface 203 (e.g., inside back plate surface, etc.) and a second back plate surface 204 (e.g., outside back plate surface, etc.). Second back plate surface 204 may be opposite first back plate surface 203. Second back plate surface 204 may be parallel with first back plate surface 203. First back plate surface 203 and second back plate surface 204 may be joined by a first back plate edge 205 (e.g., top back plate edge, etc.) and a second back plate edge 206 (e.g., bottom back plate edge, etc.) First back plate edge 205 may oppose second back plate edge 206. First back plate surface 203 and second back plate surface 204 may extend between a first backplate end 201 (e.g., first back plate side, etc.) and a second backplate end 202 (e.g., second back plate side, etc.). A widest dimension of back plate 200 may be a width between first back plate end 201 and second back plate end 202. The width between first back plate end 201 and second back plate end 202 may be at least one inch (2.54 centimeters), at least two inches (5.08 centimeters), at least three inches (7.62 centimeters), or at least four inches (10.16 centimeters) in embodiments according to various aspects of the present disclosure. The width between first back plate end 201 and second back plate end 202 may be configured to minimize an overall width of mount 100.

In various embodiments, back plate 200 may comprise a structure (e.g., one of a finger and a hook) configured to cooperate with a corresponding structure (e.g., the other of the finger and the hook) of front plate 300. The structure may extend from a portion of back plate 200. In embodiments, the structure may extend from the portion of back plate 200 at one or more angles. The one or more angles may be defined relative to a plane of a surface of the portion of the back plate from which the structure extends. The structure may comprise a shape defined by one or more portions of the structure. The structure may include one or more engagement surfaces.

In various embodiments, a structure of back plate 200 may include a finger. The finger may extend from an edge of a portion of back plate 200. In embodiments, a length of the edge may be greater than a corresponding length of the finger, wherein the finger extends from a subset of the edge. The finger may comprise an obtuse shape. For example, an angle formed by the finger may be greater than ninety degrees, greater than one hundred and five degrees, greater than one hundred and twenty degrees, greater than one hundred and thirty-five degrees, greater than one hundred and fifty degrees, or greater than one hundred and sixty-five degrees. The finger may include one or more surfaces. In embodiments, each surface of the finger may meet another surface of the finger at one of a right angle and obtuse angle. In various embodiments, back plate 200 may comprise two or more structures (e.g., two or more of a finger and a hook) configured to cooperate with corresponding structures (e.g., two or more of the other of the finger and the hook) of front plate 300 to couple back plate 200 with front plate 300. The structures may extend from one or more portions of back plate 200. The structures may oppose one another. The structures may be disposed on opposite sides of back plate 200. The structures may comprise fingers configured to engage hooks of front plate 300. Alternatively, the structures may comprise hooks configured to engage fingers of front plate 300. The structures may comprise a shape defined by two or more portions of the structures. For example, the structures may comprise an angular shape. In various embodiments, the structures may form an angle with another portion of back plate 200. For example, the structures may form an angle with center back plate portion 290. In various embodiments, back plate 200 may comprise more than two structures, such as for example, three structures, four structures, and so on. The number of structures of back plate 200 may be equal to a number of corresponding structures of front plate 300.

In various embodiments, each of the one or more structures may comprise one or more engagement surfaces configured to cooperate with corresponding surfaces of front plate 300. The number of engagement surfaces may correspond with a number of corresponding surfaces of front plate 300. For example, a first structure may comprise one engagement surface, two engagement surfaces, three engagement surfaces, and so on. Each engagement surface may form an angle with an adjacent engagement surface. The one or more engagement surfaces may comprise features configured to increase a static coefficient of friction between back plate 200 and article of wear 3. For example, the one or more engagement surfaces may be textured, knurled, or otherwise shaped to improve grip. Each engagement surface may form an engagement edge (e.g., edge) with an adjacent engagement surface. The number of engagement edge may be one less than the number of engagement surfaces. For example, a structure comprising one engagement surface may comprise no engagement edge, while a structure comprising three engagement surfaces may comprise two engagement edges. Each engagement edge of back plate 200 may be configured to align (e.g., mate, etc.) with a corresponding engagement edge of front plate 300.

In various embodiments, the one or more structures may comprise one or more shoulders configured to cooperate with one or more corresponding structures of front plate 300. Each shoulder may be disposed at a respective end of a respective structure. Each shoulder may be disposed along a respective edge of a respective structure. Each shoulder may form a step (e.g., ledge, shelf, etc.) with an engagement surface of a respective structure. Each shoulder may protrude from a respective engagement surface of a respective structure. The one or more shoulders may be configured to limit translation of back plate 200 relative to front plate 300. The one or more shoulders may be configured to align and/or maintain engagement of back plate 200 with front plate 300.

In various embodiments, back plate 200 may comprise a pair of fingers. For example, with reference to FIG. 2, back plate 200 may comprise a first finger 210 (e.g., first back plate finger, etc.) and a second finger 220 (e.g., second back plate finger, etc.).

In various embodiments, first finger 210 may be adjacent center back plate region 290. First finger 210 may extend from center back plate portion 290 to first back plate end 201. First finger 210 may be tangent with center back plate portion 290. In some embodiments, first finger 210 may be adjacent first backplate surface 203. For example, first finger 210 may protrude from first back plate surface 203. In other embodiments, first finger 210 may be adjacent second back plate surface 204. For example, first finger 210 may protrude from second back plate surface 204.

In various embodiments, second finger 220 may be adjacent center back plate region 290. Second finger 220 may extend from center back plate portion 290 to first back plate end 201. Second finger 220 may oppose first finger 210. Second finger 220 may be tangent with center back plate portion 290. In some embodiments, second finger 220 may be adjacent first back plate surface 203. For example, second finger 220 may protrude from first back plate surface 203. In other embodiments, second finger 220 may be adjacent second back plate surface 204. For example, second finger 220 may protrude from second back plate surface 204.

In various embodiments, first finger 210 may comprise a pair of engagement surfaces. For example, first finger 210 may include a first engagement surface 211 and a second engagement surface 212. In various embodiments, first engagement surface 211 may form an angle with second engagement surface 212. The angle formed by first engagement surface 211 and second engagement surface 212 may be greater than ninety degrees, greater than one hundred and five degrees, greater than one hundred and twenty degrees, greater than one hundred and thirty-five degrees, greater than one hundred and fifty degrees, or greater than one hundred and sixty-five degrees. The angle formed by first engagement surface 211 and second engagement surface 212 may be configured to minimize an overall thickness of mount 100. In various embodiments, the angle formed by first engagement surface 211 and second engagement surface 212 may be configured to align back plate 200 with a corresponding engagement edge of front plate 300.

In various embodiments, an angle formed by two adjacent engagement surfaces of a finger may include an engagement edge. The engagement edge may include a point at which a first edge of a first engagement surface of the two adjacent engagement surfaces meets a second edge of a second engagement surface of the two adjacent engagement surfaces. For example, engagement edge 213 may include a point at which an upper edge (e.g., rim) of first engagement surface 211 meets an upper edge of second engagement surface 212, wherein each of the upper edges may be disposed along respective engagement surfaces 211,212 opposite respective edges of engagement surfaces 211,212 at which engagement surfaces 211,212 join back plate surface 204. In embodiments, the engagement edge may be disposed along a third edge of the finger along which the two adjacent engagement surfaces meet. For example, engagement edge 213 may be disposed along an edge at which first engagement surface 211 and second engagement surface 212 meet, wherein the edge is disposed between engagement edge 213 and backplate surface 204.

In various embodiments, second finger 220 may comprise a pair of engagement surfaces. For example, second finger 220 may include a first engagement surface 221 (e.g., third engagement surface, etc.) and a second engagement surface 222 (e.g., fourth engagement surface, etc.). In various embodiments, first engagement surface 221 may form an angle with second engagement surface 222. The angle formed by first engagement surface 221 and second engagement surface 212 may comprise an engagement edge, such as second engagement edge 223. The angle formed by first engagement surface 221 and second engagement surface 222 may be greater than ninety degrees, greater than one hundred and five degrees, greater than one hundred and twenty degrees, greater than one hundred and thirty-five degrees, greater than one hundred and fifty degrees, or greater than one hundred and sixty-five degrees. The angle formed by first engagement surface 221 and second engagement surface 222 may be configured to minimize an overall thickness of mount 100. In various embodiments, second engagement edge 223 formed by first engagement surface 221 and second engagement surface 222 may be configured to align back plate 200 with a corresponding engagement edge of front plate 300.

In various embodiments, first finger 210 may comprise one or more shoulders. In various embodiments, first finger 210 may comprise a pair of shoulders configured to cooperate with front plate 300. First finger 210 may comprise a first back plate shoulder 231 (e.g., first shoulder, etc.) and a second back plate shoulder 232 (e.g., second shoulder, etc.). First back plate shoulder 231 may be adjacent and/or contiguous with first back plate edge 205. Second back plate shoulder 232 may be adjacent and/or contiguous with second back plate edge 206. First back plate shoulder 231 may oppose second black plate shoulder 232. First back plate shoulder 231 may be configured to limit translation of back plate 200 in a first direction relative to front plate 300. Second back plate shoulder 232 may be configured to limit translation of back plate 200 in a second direction relative to front plate 300. The first direction may be opposite the second direction. A distance between first back plate shoulder 231 and second back plate shoulder 232 may be equal to or greater than a height of a hook, such as first hook 410 of base 400 (with brief reference to FIG. 4) or second hook 620 of slide 600 (with brief reference to FIG. 6), as discussed further herein.

In various embodiments, second finger 220 may comprise one or more shoulders. Second finger 220 may comprise a third back plate shoulder 233 (e.g., third shoulder, etc.) and a fourth back plate shoulder 234 (e.g., fourth shoulder, etc.). Third back plate shoulder 233 may be adjacent and/or contiguous with first back plate edge 205. Fourth back plate shoulder 234 may be adjacent and/or contiguous with second back plate edge 206. In various embodiments, third back plate shoulder 233 may be coplanar or parallel with first back plate shoulder 231. In various embodiments, fourth back plate shoulder 234 may be coplanar or parallel with second back plate shoulder 232. Third back plate shoulder 233 may oppose fourth black plate shoulder 234. Third back plate shoulder 233 may be configured to limit translation of back plate 200 in a first direction relative to front plate 300. Fourth back plate shoulder 234 may be configured to limit translation of back plate 200 relative to front plate 300 in a second direction. The second direction may be opposite the first direction. A distance between third back plate shoulder 233 and fourth back plate shoulder 234 may be equal to or greater than a height of a hook, such as first hook 410 of base 400 (with brief reference to FIG. 4) or second hook 620 of slide 600 (with brief reference to FIG. 6), as discussed further herein.

Figure 3:
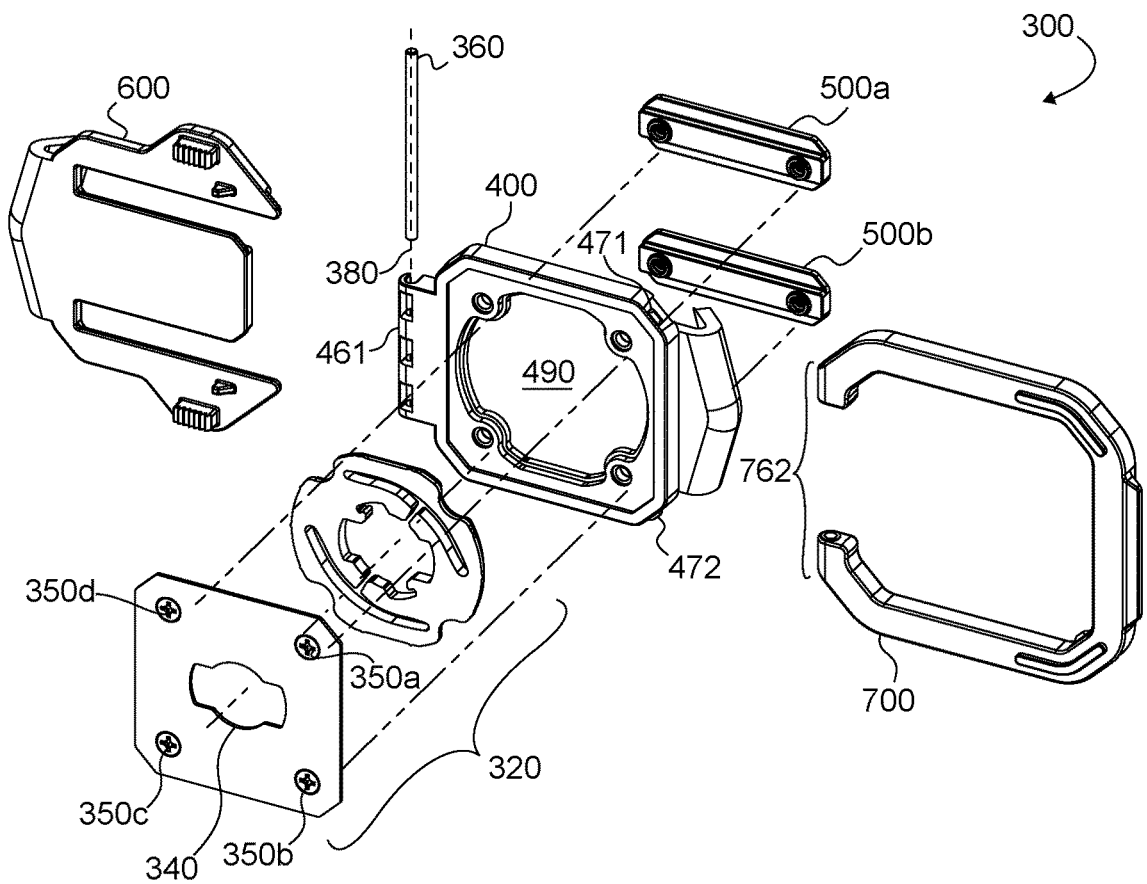
FIG. 3 is an exploded view showing an implementation of a front plate of a mount, according to one or more aspects described herein.

In various embodiments, and with reference to FIG. 3, a front plate (e.g., front plate assembly, first plate, outside plate, mounting plate, etc.) of a mount 100 is disclosed. It should be understood by one skilled in the art that FIG. 3 is an example illustration of front plate 300, and one or more of the components of front plate 300 may be located in any suitable position within, or external to, front plate 300. The components of front plate 300 may be formed using any number of methods, such as casting, forging, molding, and machining. A shape, size, and/or thickness of front plate 300 may be configured to minimize an overall thickness of mount 100. Front plate 300 may be configured to couple with accessory 1. Front plate 300 may be configured to engage a plurality of structures of back plate 200, such as first finger 210 and second finger 220, described previously herein. Front plate 300 may engage back plate 200 over article of wear 3. Front plate 300 may be configured to mount accessory 1 to article of wear 3. In the example of FIG. 3, front plate 300 may comprise a base 400 (e.g., front base plate, frame, etc.), a slide 600 (e.g., c-slide, etc.), and a swing 700.

In various embodiments, front plate 400 may include a base configured to couple an accessory. For example, base 400 of front plate 300 may be configured to couple with accessory 1. In some embodiments, base 400 may be configured to permanently engage accessory 1. For example, base 400 may couple with accessory 1 via methods such as fasteners, welds, heat stakes, adhesives, and/or the like. As another example, base 400 may be unitary with accessory 1. That is, base 400 may be directly integrated with accessory 1. In other embodiments, base 400 may be configured to releasably receive accessory 1. For example, base 400 may be configured to releasably receive accessory 1 via a coupler, such as those described previously herein.

In various embodiments, base 400 may include a coupler configured to mechanically couple to an accessory. For example, base 400 may comprise coupler 320. Coupler 320 may comprise one or more components configured to couple an accessory to base 400. The one or more components may include one or more of the group comprising panels, rings, posts, arms, receivers, or other mechanical features configured to mechanically couple to (e.g., receive, insert into, engage, etc.,) one or more corresponding features of the accessory. For example, coupler 320 may comprise a receiver (e.g., opening, slot, etc.) and one or more arms, wherein the receiver is configured to receive a post of an accessory and the one or more arms are configured to resist rotation of the post after the post is received through the receiver.

In various embodiments, fasteners may fasten coupler 320 to base 400. For example, fasteners 350a-350d may fasten coupler 320 to base 400. In various embodiments, fasteners 350a-350d may fasten directly to base 400. For example, fasteners 350a-350d may thread directly into threaded inserts disposed in base 400. As another example, fasteners 350a-350d may comprise heat stake posts extending from base 400, which may be heat staked to couple coupler 320 to base 400. In various embodiments, fasteners 350a-350d may pass through base 400 and fasten one or more retainers, such as first retainer 500a and second retainer 500b, to base 400. In various embodiments, coupler 320 may comprise a receiver, such as receiver 340. Receiver 340 may be configured to releasably receive a respective coupling feature of accessory 1. In this manner, accessory 1 may be releasably engaged with front plate 300 via receiver 340.

In various embodiments, slide 600 may be slidably engaged with base 400. One or more structures of slide 600 may be configured to engage one or more respective structures of base 400. Engagement of the one or more structures of slide 600 with the one or more respective structures of base 400 may constrain movement of slide 600 to a linear axis. In other words, slide 600 may slide (e.g., translate, move linearly) relative to base 400. Slide 600 may be configured to slidably engage base 400 to accommodate various articles of wear 3 as discussed further herein.

In various embodiments, base 500 may comprise one or more retainers configured to limit movement of a slide engaged with base 500. For example, base 500 may include first retainer 500a and/or second retainer 500b, each of which may respectively cooperate with slide 600 to limit movement of slide 600 to translation along a linear axis. In various embodiments, first retainer 500a and second retainer 500b may also prevent slide 600 from disengaging base 400. That is, first retainer 500a and second retainer 500b may be assembled to base 400 to permanently couple slide 600 to base 400. In various embodiments, fasteners 350a-350d may pass through base 400 and fasten directly to retainers 500a/500b.

In various embodiments, front plate 300 may include a swing configured to selectively retain front plate 300 in a position relative to back plate 200. The swing may be repositioned relative to another component of front plate 300 to selectively retain front plate 300 in the position relative to back plate 200. The swing may be adjustably coupled to another component of front plate 300. For example, swing 700 may be rotatably coupled with base 400 about an axis of rotation 380.

In various embodiments, swing 700 may be rotatably coupled with base 400 via a hinge configured to constrain movement of swing 700 to rotational movement (e.g., rotation) relative to base 400. For example, swing 700 may be rotatably coupled with base 400 via a living hinge, in which case base 400 and swing 700 may be unitary. In various embodiments, base 400 may comprise a first portion of a hinge, such as first hinge portion 461, and swing 700 may comprise a second portion of a hinge, such as second hinge portion 762. First hinge portion 461 may cooperate with second hinge portion 762 to rotatably couple base 400 to swing 700. Swing 700 may be configured to rotate about axis of rotation 380 (e.g., rotational axis, etc.) relative to base 400. In various embodiments, one or more joints, such as a pin 360 (e.g., pin joint, dowel pin, etc.) may join first hinge portion 461 of base 400 with second hinge portion 762 of swing 700. Pin 360 may comprise a cylindrical shape, such as a shaft. Pin 360 may be concentric with axis of rotation 380. Pin 360 may comprise chamfered ends to assist in assembly. In some embodiments, pin 360 may be press fit into a first hinge portion 461 of base 400, and second hinge portion 762 of swing 700 may slip around pin 360. In other embodiments, pin 360 may be press fit into second hinge portion 762 of swing 700, and first hinge portion 461 of base 400 may slip around pin 360.

In various embodiments, swing 700 may cooperate with slide 600. Swing 700 may rotate about base 400 to engage one or more structures of swing 700 with one or more respective structures of slide 600. Swing 700 may engage slide 600 to retain (e.g., secure, lock, etc.) slide 600 in a particular position relative to base 400 as discussed further herein.

In various embodiments, it may be advantageous for swing 700 to cooperate with accessory 1. For example, accessory 1, when coupled to front plate 300, may prevent swing 700 from disengaging slide 600 by mechanically preventing swing 700 from rotating away from slide 600/base 400. Accessory 1 may block, limit, or otherwise constrain movement of swing 700, thereby requiring accessory 1 to be decoupled from base 400, before swing 700 may disengage slide 600.

Figure 4:
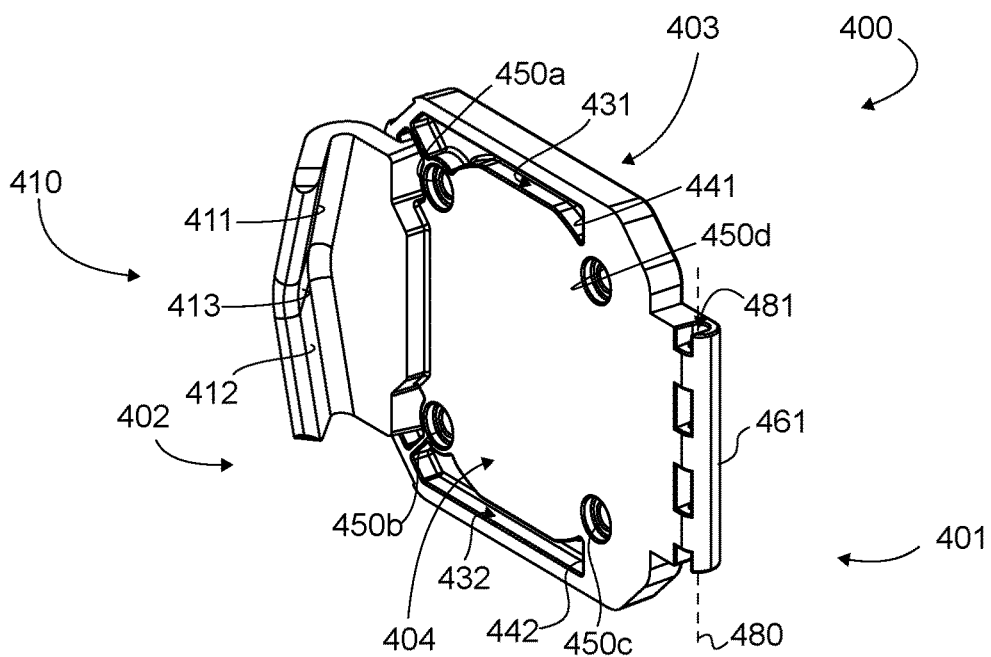
FIG. 4 is a rear perspective view showing an implementation of a base of a front plate, according to one or more aspects described herein.

FIG. 4 shows a rear perspective view of base 400. It should be understood by one skilled in the art that FIG. 4 is an example illustration of base 400, and one or more of the components of base 400 may be located in any suitable position within, or external to, base 400. A shape, size, and/or thickness of base 400 may be configured to minimize an overall thickness of mount 100. In various embodiments, base 400 may be a unitary base. In that regard, base 400 may be injection molded, milled, forged, die cast, additively manufactured, and/or the like. In various embodiments, base 400 may be configured to directly couple with accessory 1. Base 400 may comprise one or more complementary structures configured to cooperate (e.g., engage, interlock, etc.) with corresponding structures of back plate 200, such as first finger 210 and/or second finger 220.

In various embodiments, base 400 may include a first base surface 403 (e.g., first base plate surface, outside surface, etc.) and a second base surface 404 (e.g., second base plate surface, inside surface, etc.). Second base surface 404 may be opposite first base surface 403. Second base surface 404 may be parallel with first base surface 403. A thinnest dimension of base 400 may be a thickness between first base surface 403 and second base surface 40413. The thickness between first base surface 403 and second base surface 404 may be less than 0.125 inches, (0.3175 centimeters), less than 0.25 inches (0.635 centimeters), less than 0.375 inches (0.953 centimeters), or less than 0.5 inches (1.27 centimeters) in embodiments according to various aspects of the present disclosure. First base surface 403 and second base surface 404 may extend between a first base end 401 (e.g., first base side, etc.) and a second base end 402 (e.g., second base side, etc.). A widest dimension of base 400 may be a width between first base end 401 and second base end 402. The width between first base end 401 and second base end 402 may be configured to minimize an overall width of mount 100.

In various embodiments, base 400 may comprise one or more fastening features configured to physically couple to other components of front plate 300. For example, base 400 may include fastening features 450a-450d, for coupling with coupler 320 as discussed previously herein. Fastening features 450a-450d may comprise threaded holes, threaded inserts, heat stake posts, and/or the like. For example, fasteners 350a-350d may engage fastening features 450a-450d to fasten coupler 320 to base 400. In various embodiments, fastening features 450a-450d may each comprise a thru-hole (e.g., bore, passageway, etc.) to allow fasteners 350a-350d to engage one or more retainers, such as first retainer 500a and second retainer 500b (with brief reference to FIG. 5b).

In various embodiments, base 400 may comprise a center region, such as center base portion 490. Center base portion 490 may be configured to accept a portion of coupler 320. For example, center base portion 490 may comprise a recess (e.g., void, etc.), configured to engage a portion of coupler 320. Center base portion 490 may be configured to minimize an overall thickness of front plate 300.

In various embodiments, base 400 may include one or more structures (e.g., one of a finger and a hook) configured to cooperate with one or more corresponding structures (e.g., the other of the finger and the hook) of back plate 200. The one or more structures may extend from a portion of base 400. In embodiments, the structure may extend from the portion of base 400 at one or more angles. The one or more angles may be defined relative to a plane of a surface of the portion of the base from which the structure extends. The structure may comprise a shape defined by one or more portions of the structure. The structure may include one or more engagement surfaces.

In various embodiments, a structure of base 400 may include a hook. For example, base 400 may include a hook configured to engage a finger of back plate 200. The hook may provide a concave region in which a complementary structure may be received. The hook may extend from an edge of a portion of base 400. In embodiments, a length of the edge may be greater than a corresponding length of the hook, wherein the hook extends from a subset of the edge. The hook may comprise an acute shape. For example, an angle formed by the hook may be less than ninety degrees, less than seventy-five degrees, less than forty-five degrees, less than thirty degrees, or less than fifteen degrees, according to various aspects of the present disclosure. The hook may include one or more surfaces. In embodiments, each surface of the hook may meet another surface of the hook at one of a right angle and obtuse angle.

A shape of the one or more hooks of base 400 may be configured to cooperate with a shape of the one or more structures of back plate 200. For example, base 400 may comprise a first hook 410 (e.g. first base hook, etc.). First hook 410 may be configured to cooperate with first finger 210 and/or second finger 220. First hook 410 may be disposed at second base end 402. In some embodiments, first hook 410 may be adjacent first base surface 403. In other embodiments, first hook 410 may be adjacent second base surface 404. First hook 410 may comprise an angular shape. The angular shape of first hook 410 may complement the angular shape of first finger 210 and/or the angular shape of second finger 220 (with brief reference to FIG. 8).

In various embodiments, first hook 410 may comprise one or more engagement surfaces configured to cooperate with respective surfaces of back plate 200. The number of engagement surfaces may correspond with the number of engagement surfaces of back plate 200. For example, first hook 410 may comprise one engagement surface, two engagement surfaces, three engagement surfaces, and so on. Each engagement surface may form an angle with an adjacent engagement surface. In various embodiments, each engagement surface of a hook may be oriented toward another surface to form a concave region in which a complementary structure may be inserted. Each engagement surface may form an engagement edge with an adjacent engagement surface. The number of engagement edges may be one less than the number of engagement surfaces. The one or more engagement surfaces may comprise features configured to increase a static coefficient of friction between front plate 300 and article of wear 3. For example, the one or more engagement surfaces may be textured, knurled, or otherwise shaped to improve grip.

In various embodiments, first hook 410 may comprise a pair of engagement surfaces. For example, first hook 410 may include a first hook engagement surface 411 and a second hook engagement surface 412. In various embodiments, first hook engagement surface 411 may form an angle comprising an engagement edge engagement edge, such as a third engagement edge 413, with second hook engagement surface 412. The angle formed by first hook engagement surface 411 and second hook engagement surface 412 may be greater than ninety degrees, greater than one hundred and five degrees, greater than one hundred and twenty degrees, greater than one hundred and thirty-five degrees, greater than one hundred and fifty degrees, or greater than one hundred and sixty-five degrees. The angle formed by first hook engagement surface 411 and second hook engagement surface 412 may be configured to minimize an overall thickness of mount 100. In various embodiments, third engagement edge 413 formed by first hook engagement surface 411 and second hook engagement surface 412 may be configured to align (e.g., position, orientate, etc.) front plate 300 with a corresponding engagement edge of back plate 200. For example, third engagement edge 413 of base 400 may be configured to cooperate with first engagement edge 213 of back plate 200 and/or second engagement edge 223 of back plate 200.

In various embodiments, an angle formed by two adjacent engagement surfaces of a hook may include an engagement edge. The engagement edge may include a point at which a first edge of a first engagement surface of the two adjacent engagement surfaces meets a second edge of a second engagement surface of the two adjacent engagement surfaces. For example, engagement edge 413 may include a point at which an outer edge (e.g., rim) of first hook engagement surface 411 meets an outer edge of second hook engagement surface 412, wherein each of the outer edges may be disposed along respective hook engagement surfaces 411,412 opposite respective edges of hook engagement surfaces 411,412 at which hook engagement surfaces 411, 412 join another surface of base 400. In embodiments, the engagement edge may be disposed along a third edge of the hook along which the two adjacent engagement surfaces meet. For example, engagement edge 413 may be disposed along an edge at which first hook engagement surface 411 and second hook engagement surface 412 meet, wherein the edge is disposed between engagement edge 413 and other portions of base 400.

In various embodiments, base 400 may comprise a portion of a hinge, such as first hinge portion 461, configured to rotationally engage swing 700. First hinge portion 461 may be disposed at first base end 401. First hinge portion 461 may extend parallel with first base end 401. First hinge portion 461 may comprise a first bore 481 (e.g., base bore, etc.) configured to receive at least a portion of a joint, such as pin 360. The bore may be cylindrical in shape. A cylindrical axis of the bore may be first bore axis 481. First bore axis 481 may be parallel with first base end 401. First bore axis 481 may be concentric with axis of rotation 380. In various embodiments, a diameter of first bore 481 may be slightly less than a diameter of pin 360 so as to engage pin 360 in a press-fit fashion. For example, a diameter of first bore 481 may be 0.001 inches (0.003 centimeters) less than a diameter of pin 360, 0.002 inches (0.005 centimeters) less than a diameter of pin 360, or 0.003 inches (0.008 centimeters) less than a diameter of pin 360, according to various aspects of the present disclosure. In various embodiments, a diameter of first bore 481 may be slightly greater than a diameter of pin 360 so as to engage pin 360 in a slip-fit fashion. For example, a diameter of the bore may be 0.001 inches (0.003 centimeters) greater than a diameter of pin 360, 0.002 inches (0.005 centimeters) greater than a diameter of pin 360, or 0.003 inches (0.008 centimeters) greater than a diameter of pin 360, according to various aspects of the present disclosure.

In various embodiments, base 400 may comprise one or more latch features configured to retain swing 700 adjacent first base surface 403. The one or more latch features may be configured to cooperate with one or more respective latch features of swing 700. In various embodiments, latch features may comprise protrusions, detents, ball detents, snap fits, clasps, and/or the like. In various embodiments, base 400 may comprise one or more protrusions and/or detents configured to engage one or more protrusions and/or detents of swing 700. For example, base 400 may comprise a first latch feature 471 and a second latch feature 472 (with brief reference to FIG. 3). First latch feature 471 and second latch feather 472 may disposed along an outer edge of base 400. For example, first latch feature 471 and second latch feature 472 may be disposed on an edge defined between first base surface 403 and second base surface 404. First latch feature 471 and second latch feature 472 may be configured to engage a respective latch feature of swing 700, such as first latch feature 771 and second latch feature 772 (with brief reference to FIG. 7) to secure swing 700 adjacent first base surface 403 as discussed further herein.

In various embodiments, base 400 may comprise one or more stops configured to engage one or more portions and/or structures of slide 600 in a first direction to limit translation of slide 600 relative to base 400 in the first direction. For example, base 400 may comprise a first stop 441 and a second stop 442. First stop 441 and second stop 442 may be recessed in second base surface 404. For example, first stop 441 and second stop 442 may comprise a wall (e.g., step, etc.). In various embodiments, first stop 441 may be a wall of a first track, such as first track 431. In various embodiments, second stop 442 may be a wall of a second track, such as second track 432. configured to engage one or more features of slide 600 as discussed further herein.

In various embodiments, base 400 may comprise one of a tongue and a groove configured to slidably engage one or more portions of slide 600. In various embodiments, retainer 500a and retainer 500b may cooperate with second base surface 404 to form one or more grooves configured to receive one or more portions of slide 600 as discussed further herein.

Figure 5A:
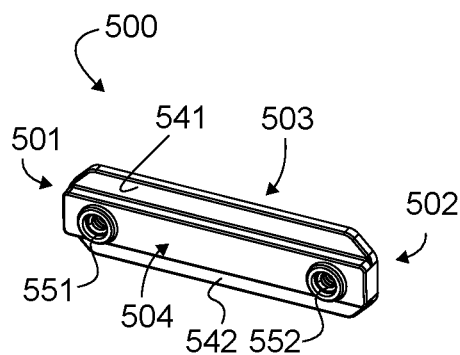
FIG. 5a is a front perspective view showing an implementation of a retainer for a front plate, according to one or more aspects described herein.
Figure 5B:
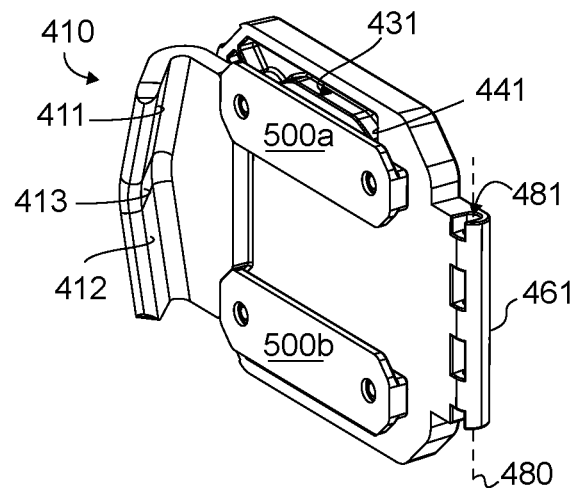
FIG. 5b is a rear perspective view showing another implementation of a front plate, according to one or more aspects described herein.

FIG. 5a shows a front perspective view of a retainer 500, which may be similar to, or share similar aspects or components with first retainer 500a and/or second retainer 500b. It should be understood by one skilled in the art that FIG. 5a is an example illustration of retainer 500, and one or more of the components of retainer 500 may be located in any suitable position within, or external to, retainer 500. Retainer 500 may be formed using any number of methods, such as casting, forging, molding, and machining. In addition, retainer 500 may be formed of multiple components that are assembled together.

In various embodiments, retainer 500 may extend longitudinally from a first retainer end 501 to a second retainer end 502. A first retainer surface 503 may join first retainer end 501 and second retainer end 502. A second retainer surface 504 may oppose first retainer surface 503. Second retainer surface 504 may join first retainer end 501 and second retainer end 502.

In various embodiments, retainer 500 may include one or more recesses. For example, retainer 500 may include a first undercut 541 (e.g., a first recess, a first dovetail, etc.) and a second undercut 542 (e.g., a second recess, a second dovetail, etc.). Undercuts 541/542 may be sized and shaped to receive a portion of slide 600. In that regard, undercuts 541/542 may comprise any suitable shape configured to receive a portion of slide 600, such as, for example, a square shape, a rectangular shape, a dovetail shape, a dado shape, etc.

In various embodiments, retainer 500 may comprise one or more fastening features, such as first fastening feature 551 and second fastening feature 552. Fastening features 551/552 may be sized and shaped to receive a portion of any of fasteners 350a-350d. Fastening features 551/552 may comprise a thru hole, a threads, a threaded insert, and/or the like.

Figure 6:
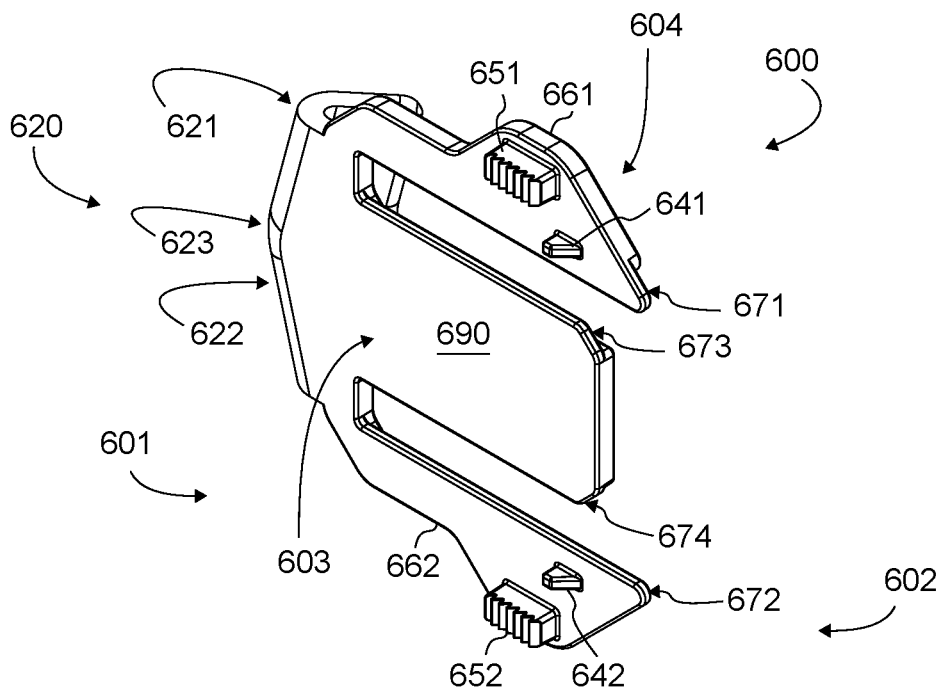
FIG. 6 is a front perspective view showing an implementation of a slide of a front plate, according to one or more aspects described herein.

FIG. 6 shows a front perspective view of slide 600 according to various embodiments herein. It should be understood by one skilled in the art that FIG. 6 is an example illustration of slide 600, and one or more of the components of slide 600 may be located in any suitable position within, or external to, slide 600. A shape, size, and/or thickness of slide 600 may be configured to minimize an overall thickness of mount 100. In various embodiments, slide 600 may be a unitary slide. In that regard, slide 600 may be injection molded, milled, forged, die cast, additively manufactured, and/or the like. Slide 600 may comprise a plane of symmetry. In various embodiments, slide 600 may be configured slidably engage one or more components of front plate 300. Slide 600 may comprise one or more structures configured to cooperate (e.g., engage, interlock, etc.) with respective structures of back plate 200, such as first finger 210 and/or second finger 220 as discussed further herein.

In various embodiments, slide 600 may include a first slide surface 603 and a second slide surface 604. Second slide surface 604 may be opposite first slide surface 603. Second slide surface 604 may be parallel with first slide surface 603. A thinnest dimension of slide 600 may be a thickness between first slide surface 603 and second slide surface 604. The thickness between first slide surface 603 and second slide surface 604 may be less than 0.125 inches, (0.3175 centimeters), less than 0.25 inches (0.635 centimeters), less than 0.375 inches (0.953 centimeters), or less than 0.5 inches (1.27 centimeters) in embodiments according to various aspects of the present disclosure. First slide surface 603 and second slide surface 604 may extend between a first slide end 601 (e.g., first slide side, etc.) and a second slide end 602 (e.g., second slide side, etc.). A widest dimension of slide 600 may be a width between first slide end 601 and second slide end 602. The width between first slide end 601 and second slide end 602 may be configured to minimize an overall width of mount 100.

In various embodiments, slide 600 may comprise a center region, such as center slide portion 690 (e.g., stiffener, etc.). Center slide portion 690 may be configured to slidably engage a portion of second base surface 404. For example, in a fully extended position, wherein first slide end 601 is at a furthest position relative to first base end 401, center slide portion 690 may be minimally engaged with second base surface 404. For example, in a fully contracted position, wherein first slide end 601 is at a closest position relative to first base end 401, center slide portion 690 may be maximally engaged with second base surface 404. In this regard, center slide portion 690 may be configured to stiffen slide 600 in various positions relative to base 400. For example, center slide portion 690 may be configured to reduce a likelihood of deformation of slide 600 when a normal force is applied to front plate 300. For example, center slide portion 690 may provide a reaction force to a normal force applied to front plate 300. The reaction force may reduce a stress exerted on other portions of slide 600 by distributing the load of the normal force to center slide portion 690. Distributing the load of an applied force over center slide portion 690 may reduce a likelihood of deformation of slide 600. As another example, center slide portion 690 may comprise a beam configured to stiffen slide 600.

In various embodiments, center slide portion 690 may comprise a third tongue 673 and a fourth tongue 674. Third tongue 673 and fourth tongue 674 may each be configured to slidably engage an undercut of retainer 500a/500b, such as first undercut 541 or second undercut 542 (with brief reference to FIG. 9b).

In various embodiments, slide 600 may include a structure (e.g., one of a hook and a finger) configured to engage a structure (e.g., the other of the hook and the finger) of back plate 200. For example, slide 600 may comprise a hook configured to cooperate with a finger of back plate 200 ad discussed previously herein.

In various embodiments, slide 600 may comprise a second hook 620 (e.g. first slide hook, etc.). Second hook 620 may be configured to cooperate with first finger 210 and/or second finger 220 of back plate 200. Second hook 620 may be disposed at first slide end 601. In some embodiments, second hook 620 may be adjacent second slide surface 604. In other embodiments, second hook 620 may be disposed adjacent first slide surface 603. Second hook 620 may comprise an angular shape. The angular shape of second hook 620 may complement the angular shape of first finger 210 and/or the angular shape of second finger 220 (with brief reference to FIG. 8).

In various embodiments, second hook 620 may comprise one or more engagement surfaces configured to cooperate with respective engagement surfaces of back plate 200. The number of engagement surfaces may correspond with a number of engagement surfaces of back plate 200. For example, second hook 620 may comprise one engagement surface, two engagement surfaces, three engagement surfaces, and so on. Each engagement surface may form an angle with an adjacent engagement surface. In various embodiments, each engagement surface of a hook may be oriented toward another engagement surface to form a concave region (e.g., cavity) in which a structure may be received. Each engagement surface may form an engagement edge with an adjacent engagement surface. The number of engagement edges may be one less than the number of engagement surfaces. The one or more engagement surfaces may comprise features configured to increase a static coefficient of friction between front plate 300 and article of wear 3. For example, the one or more engagement surfaces may be textured, knurled, or otherwise shaped to improve grip.

In various embodiments, second hook 620 may comprise a pair of engagement surfaces. For example, second hook 620 may include a third hook engagement surface 621 and a fourth hook engagement surface 622. In various embodiments, third hook engagement surface 621 may form an angle comprising an engagement edge, such as fourth engagement edge 623, with fourth hook engagement surface 622. The angle formed by third hook engagement surface 621 and fourth hook engagement surface 622 may be greater than ninety degrees, greater than one hundred and five degrees, greater than one hundred and twenty degrees, greater than one hundred and thirty-five degrees, greater than one hundred and fifty degrees, or greater than one hundred and sixty-five degrees. The angle formed by third hook engagement surface 621 and fourth hook engagement surface 622 may be equal to the angle formed by first hook engagement surface 411 and second hook engagement surface 412 of base 400 (with brief reference to FIG. 4). The angle formed by third hook engagement surface 621 and fourth hook engagement surface 622 may be configured to minimize an overall thickness of mount 100. In various embodiments, fourth engagement edge 623 may be configured to align (e.g., position, orientate, etc.) front plate 300 with a corresponding engagement edge of back plate 200. For example, fourth engagement edge 623 of slide 600 may be configured to cooperate with first engagement edge 213 and/or second engagement edge 223 of back plate 200.

In various embodiments, slide 600 may comprise one or more arms configured to engage base 400. The one or more arms may extend between first slide end 601 and second slide end 602. Each of the one or more arms may comprise a stop. Each of the one or more arms may comprise a set of teeth configured to engage a swing as described further herein. Each of the arms may comprise one of a tongue and a groove, configured to slidably engage a respective tongue or groove of base 400. In various embodiments, slide 600 may comprise a first slide arm 641 and a second slide arm 642. First slide arm 641 may oppose second slide arm 642. Center slide portion 690 may connect (e.g., joint) first slide arm 641 and second slide arm 642.

In various embodiments, front plate 300 may comprise a coupler configured to engage (e.g., couple, interlock, interconnect, fixedly connect, etc.) two components of front plate 300. The coupler may be integrated with at least one of the two components of front plate. The coupler may engage the two components. The two components may be engaged by the coupler in a first direction. The two components, when engaged by the coupler, may be prevented from relative motion in a second direction. In various embodiments, the first direction may be different from the second direction. In various embodiments, the first direction may be perpendicular to the second direction. In various embodiments, the coupler may engage the two components via one or more of a mechanical force and a magnetic force. For example, the coupler may include one or more of a group comprising a magnet, a ferromagnetic material, and a physical surface feature.

In various embodiments, front plate 300 may include a first coupler and a second coupler configured to engage each other. The first coupler may engage the second coupler via at least one force of a group comprising a mechanical force and a magnetic force. A first shape of the first coupler may be complementary to a second shape of the second coupler. At least one first surface of the first coupler may correspond to at least one second surface of the second coupler, wherein the at least one first surface may engage the at least one second surface. The first coupler and the second coupler may selectively engage and disengage each other in accordance with a relative position of components of front plate 300 on which the first coupler and the second coupler are disposed. For example, the first coupler may comprise set of teeth 651 and the second coupler may comprise set of teeth 751. Teeth 651 may be engaged or disengaged with teeth 751 in accordance with a relative position between slide 600 and swing 700.

In various embodiments, at least one of a first coupler and a second coupler of front plate 300 may include a protruding surface structure. The protruding surface feature may extend (e.g., protrude) above an adjacent surface of a component of front plate 300 on which the protruding surface feature is integrated. For example, the protruding surface structure may include a tooth, post, ridge, projection, ledge, or other protrusion that extends above the adjacent surface of the component of front plate 300. In embodiments, the protruding surface structure may include a set of teeth, posts, ridges, projections, ledges or other protrusions. The protruding surface structure may include a plurality of protrusions positioned at regular or irregular intervals along the adjacent surface of the component of front plate 300 on which the protruding surface feature is integrated. For example, the protruding surface feature may include set of teeth 651, which comprise extend above adjacent first slide surface 603 on which set of teeth 651 are disposed.

In various embodiments, at least one of a first coupler and a second coupler of front plate 300 include a recessed surface structure. The recessed surface feature may recede (e.g., be recessed, be inset) below an adjacent surface of a component of front plate 300 on which the recessed surface feature is integrated. For example, the recessed surface structure may include a tooth, opening, groove, impression, notch, indentation, or other recess that recedes below the adjacent surface of the component of front plate 300. In embodiments, the recessed surface structure may include a set of teeth, openings, grooves, impressions, notches, indentations, or other recesses. The recessed surface structure may include a plurality of recesses positioned at regular or irregular intervals along the adjacent surface of the component of front plate 300 on which the recessed surface feature is integrated. For example, the recessed surface feature may include set of teeth 751, which comprise recessed teeth inset below adjacent surface of swing 700 on which set of teeth 751 are disposed.

In various embodiments, each of the one or more arms of slide 600 may comprise a coupler, a slide stop, and/or a tongue. The coupler may include a set of teeth. For example, first slide arm 641 may comprise a first set of teeth 651, a first slide stop 641, and a first tongue 671. For example, second slide arm 642 may comprise a second set of teeth 652, a second slide stop 642, and a second tongue 672.

In various embodiments, set of teeth 651/652 may protrude from first slide surface 603. In various embodiments, set of teeth 651/652 may recede into first slide surface 603. Set of teeth 651/652 may longitudinally extend between first slide end 601 and second slide end 602. Set of teeth 651/652 may comprise a non-zero rake angle. For example, a rake angle of set of teeth 651/652 may be greater than 1 degree, greater than 3 degrees, greater than 5 degrees, or greater than 10 degrees according to various embodiments discussed herein. Set of teeth 651/652 may be configured to engage a respective set of teeth of swing 700, as discussed further herein. In various embodiments, each set of teeth 651/652 may comprise a number of teeth, such as 5 teeth, 10 teeth, 15 teeth, and so on. The number of teeth may correspond with a number of discreet positions of slide 600 relative to base 400, when mount 100 is in a locked configuration.

In various embodiments, first slide stop 641 may be configured to engage first stop 441 of base 400 and/or second slide stop 642 may be configured to engage second stop 442 of base 400. Engagement of slide stop 641/642 with stop 441/442 may prevent slide 600 from decoupling base 400. Slide stop 641/642 may be configured to travel within track 431/432 of base 400 respectively. In various embodiments, another portion of slide 600 may engage another portion of base 400 to prevent slide 600 from decoupling base 400. For example, a portion of set of teeth 651/652 may be configured to engage a portion of base 400, such as first hinge portion 461, in a first direction, to prevent slide 600 from further movement in the first direction.

In various embodiments, first tongue 671 and second tongue 672 may cooperate with one or more grooves (e.g., channels, tracks, guides, etc.) of base 400. Tongue 671/672 may comprise a thin protrusion extending from an edge of arm 661/662. Tongue 671/672 may longitudinally extend between first slide end 601 and second slide end 602. Tongue 671/672 may comprise a thickness less than a thickness of arm 671/672. Engagement of tongue 671/672 with one or more grooves of base 400 may constrain movement of slide 600 to linear movement relative to base 400. As another example, tongue 671/672 may slidably engage one or more undercuts of retainer 500a/500b and/or second base surface 403 (with brief reference to FIG. 9b).

Figure 7:
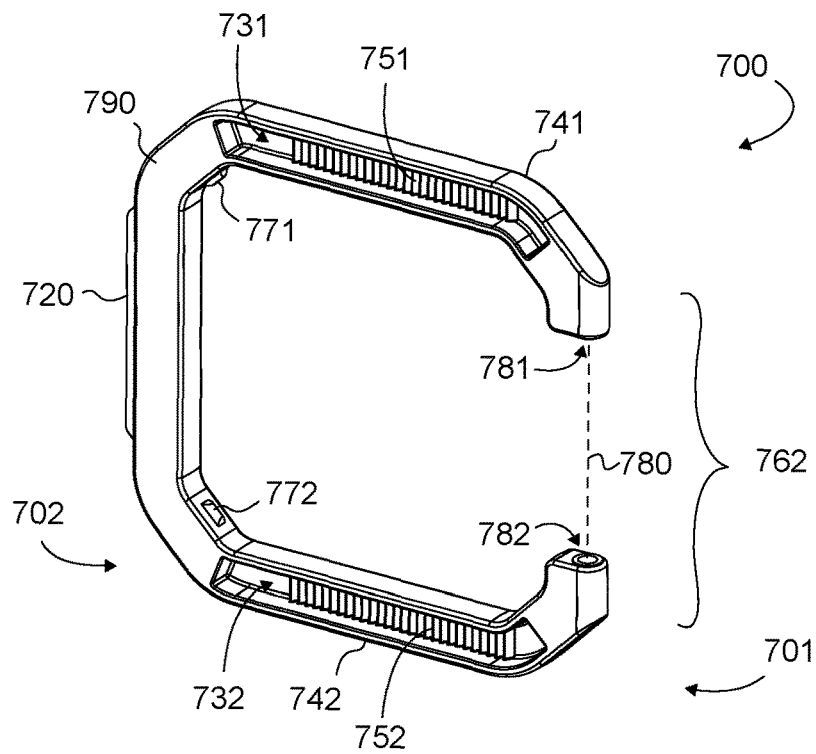
FIG. 7 is a rear perspective view showing an implementation of a swing of a front plate, according to one or more aspects described herein.

FIG. 7 shows a rear perspective view of swing 700 according to various embodiments herein. It should be understood by one skilled in the art that FIG. 7 is an example illustration of swing 700, and one or more of the components of swing 700 may be located in any suitable position within, or external to, swing 700. A shape, size, and/or thickness of swing 700 may be configured to minimize an overall thickness of mount 100. Swing 700 may comprise a plane of symmetry. In various embodiments, swing 700 may be a unitary swing. In that regard, swing 700 may be molded, milled, forged, cast, additively manufactured, and/or the like. In addition, swing 700 may be formed of multiple components that are assembled together.

In various embodiments, swing 700 may extend from a first swing end 701 to a second swing end 702. First swing end 701 may oppose second swing end 702. In various embodiments, swing 700 may comprise a pair of arms, such as first swing arm 741 and second swing arm 742. First swing arm 741 and second swing arm 742 may each extend between first swing end 701 and second swing end 702. First swing arm 741 may oppose second swing arm 742. First swing arm 741 may be parallel with second swing arm 742. In various embodiments, swing 700 may comprise center swing portion 790. Center swing portion 790 may connect first swing arm 741 and second swing arm 742. Center swing portion 790 may be perpendicular with swing arm 741/742.

In various embodiments, swing 700 may rotatably couple with base 400 via a hinge. For example, swing 700 may comprise a second hinge portion, such as second hinge portion 762. Second hinge portion 762 may be configured to rotatably couple swing 700 to base 400. Second hinge portion 762 may comprise one or more bores, such as first bore 781 and second bore 782, configured to engage pin 360. First bore 781 and second bore 782 may be sized to engage pin 360 in a press-fit manner or a slip-fit manner as previously described herein.

In various embodiments, swing 700 may comprise one or more latch features configured to engage respective latch features of base 400, such as first latch feature 471 and/or second latch feature 472. For example, swing 700 may comprise a first swing latch feature 771 and a second swing latch feature 772. First swing latch feature 771 may be configured to releasably engage first latch feature 471 of base 400. Second swing latch feature 772 may be configured to releasably engage second latch feature 472 of base 400. First swing latch feature 771 and second swing latch feature 772 may be configured to overlap with first latch feature 471 and second latch feature 472 respectively in a locked position. A torque may be required to overcome the overlap and rotate swing 700 from the locked position to an unlocked position.

In various embodiments, swing 700 may comprise a tab, such as tab 720 to provide a user a tactile feature for exerting a torque on swing 700. While a pair of latch features are shown, a singular set of latch features may be implemented, or more than two sets of latch features may be implemented.

In various embodiments, swing 700 may comprise one or more sets of teeth configured to engage the one or more sets of teeth of slide 600. Engagement of the one or more sets of teeth of swing 700 with the one or more sets of teeth of slide 600 is configured to lock slide 600 at a position relative to base 400. Swing 700 may comprise a first set of teeth 751 and a second set of teeth 752. First set of teeth 751 may extend along first swing arm 741. Second set of teeth 752 may extend along second swing arm 742. First set of teeth 751 may be oriented parallel with second set of teeth 752. In various embodiments, a length of set of teeth 751/752 may be greater than a length of set of teeth 651/652 of slide 600. In various embodiments, set of teeth 751/752 may protrude from swing arm 741/742. In various embodiments, set of teeth 751/752 may recessed in swing arm 741/742. For example, first arm 741 may comprise a first recess 731, in which first set of teeth 751 are disposed. For example, second arm 742 may comprise a second recess 732, in which second set of teeth 752 are disposed. Set of teeth 751/752 may extend between first swing end 701 and second swing end 702. Each set of teeth 751/752 may comprise a non-zero rake angle. For example, a rake angle of each set of teeth 751/752 may comprise greater than 1 degree, greater than 3 degrees, greater than 5 degrees, or greater than 10 degrees according to various embodiments discussed herein. Set of teeth 751/752 may be configured to engage respective set of teeth 651/652 of slide 600. In various embodiments, each set of teeth 751/752 may comprise a number of teeth, such as 5 teeth, 10 teeth, 15 teeth, and so on. The rake angle may be configured to provide a compressive force between set of teeth 651/652 and set of teeth 751/752 when swing 700 is in a locked position relative to base 400. A portion of the compressive force may be configured to encourage swing 700 to remain in the locked position. In various embodiments a force required to rotate swing 700 from the locked position may be greater than zero pounds force (zero newtons) and less than ten pounds force (forty-five newtons). Engagement of the one or more sets of teeth and engagement with the one or more latch features may both contribute to the force required to disengage swing 700 from the locked position.

In embodiments, movement (e.g., repositioning, rotation, etc.) of swing 700 to the locked position may engage swing 700 with base 400 and slide 600 at a same time. Motion of a single component (e.g., swing 700) may concurrently cause the single component to be engaged with two different other components (e.g., base 400, slide 600) of front plate 300. For example, movement of swing 700 may engage a first coupler of swing 700 with a second coupler of slide 600 at a same time a first latch feature of swing 700 engages with a second latch feature of base 400. The first coupler may include set of teeth 751, the second coupler may include teeth 651, the first latch feature may include latch feature 771, and the second latch feature may include 471.

Figure 8:
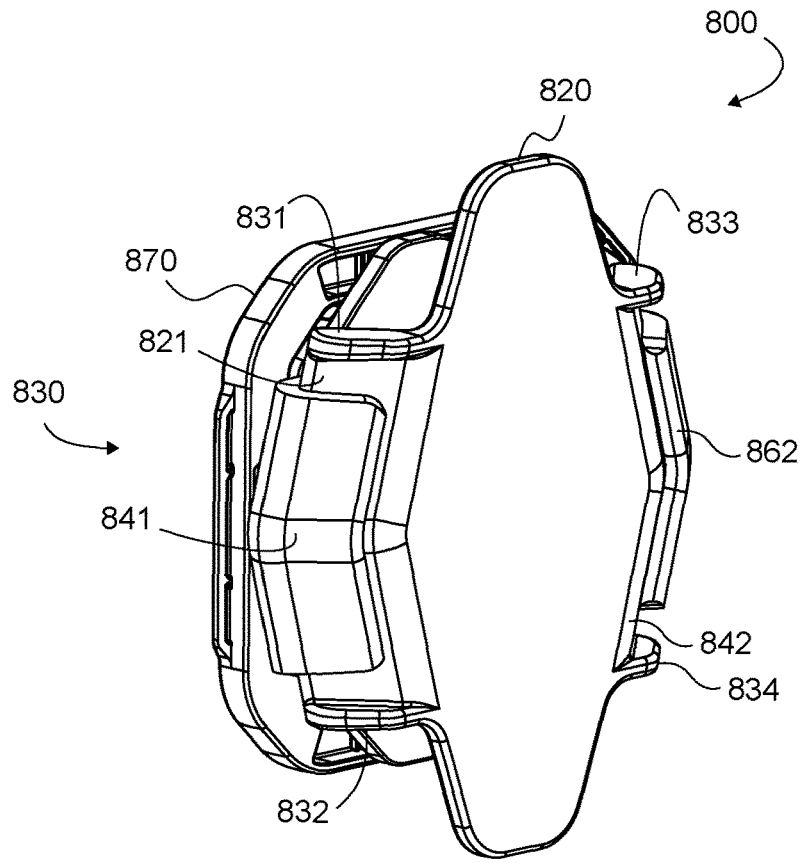
FIG. 8 is a rear perspective view of an implementation of a mount, according to one or more aspects described herein.

FIG. 8 shows a rear perspective view of a mount 800, which may be similar to, or share similar aspects or components with the mounts previously described herein. In FIG. 8, a front plate 830 and a back plate 820 are shown cooperatively engaging one another. While mount 800 is configured to mount to an article of wear, the article of wear is hidden from view to illustrate a manner in which front plate 830 may releasably engage back plate 820 in accordance with various aspects described herein. In an embodiment, a plurality of hooks, such as first hook 841 and second hook 862 of front plate 830 are configured to releasably engage a plurality of fingers, such as first finger 821 and second finger 821 of back plate 820. With a full understanding of the mounting apparatus disclosed herein, one will appreciate that a distance between first hook 841 and second hook 862 may be manipulated by moving (e.g. extending, contracting) a slide relative to a base. In various embodiments, manipulating the distance between hooks 841/862 may adjust (e.g., regulate) a first gap between first finger 821 and first hook 841 and a second gap between second finger 8882 and second hook 862. Adjusting the first gap and the second gap may enable mount 80 to releasably couple to a variety of articles of wear.

Figure 9A:
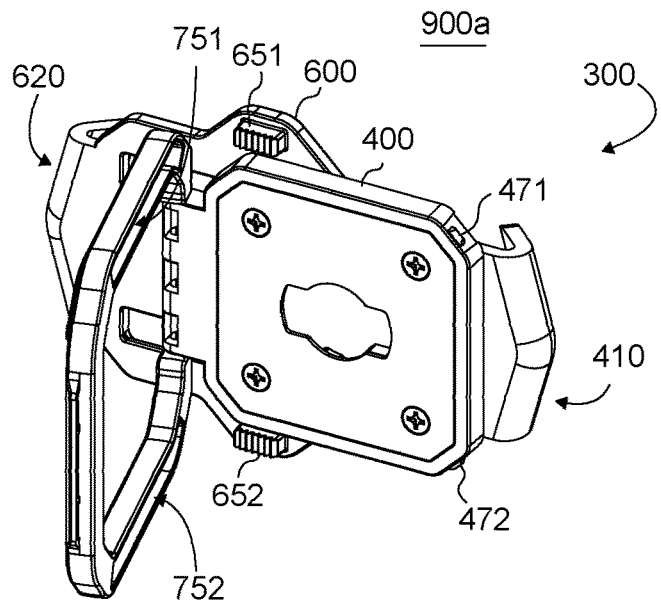
FIG. 9a is a front perspective view of an implementation of a front plate in a first configuration, according to one or more aspects herein.
Figure 9B:
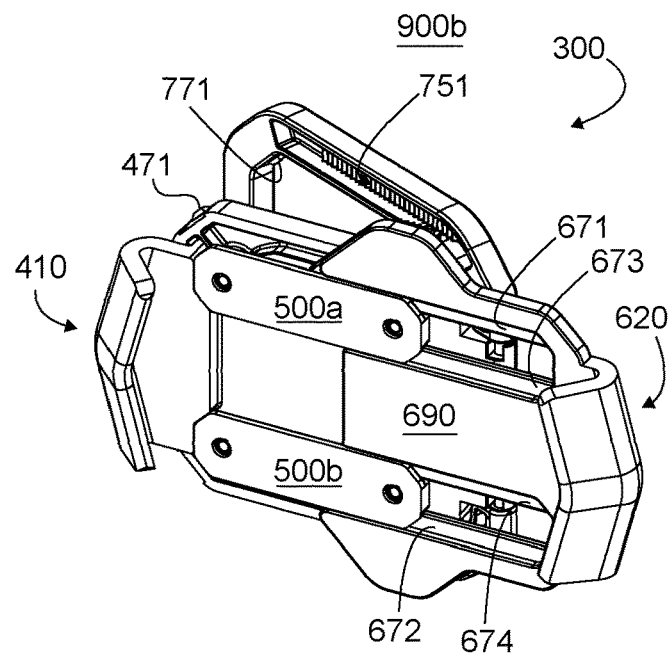
FIG. 9b is a rear perspective view of an implementation of a front plate in a second configuration, according to one or more aspects herein.

FIGS. 9a-9b show examples of a front plate in various configurations (e.g. states). A front plate may comprise numerous configurations because a slide may linearly translate along a base between a fully extended position to a fully contracted position, and a swing may independently rotate about an axis of rotation between a locked (e.g., closed) position to an unlocked (e.g., open) position. In various embodiments, a front plate may be in a locked position when one or more latch features of a swing (e.g., first latch feature 771 of swing 700, second latch feature 772 of swing 700) engage one or more latch features of a base (e.g., first latch feature 471 of base 400, second latch feature 472 of base 400). In various embodiments, a front plate may be in a locked position when one or more sets of teeth of a slide (e.g., first set of teeth 651 of slide 600, second set of teeth 652 of slide 600) are engaged with one or more sets of teeth of a swing (e.g., first set of teeth 751 of swing 700, second set of teeth 752 of swing 700). In various embodiments, front plate 300 may be in an unlocked, position when latch features of a swing (e.g., first latch feature 771 of swing 700, second latch feature 772 of swing 700) are disengaged with latch features of a base (e.g., first latch feature 471 of base 400 second latch feature 472 of base 400).

In example configuration 900a and 900b, front plate 300 may be in a fully extended and open position, wherein slide 600 is fully extended away from base 400. In a fully extended position, a distance between first hook 410 of base 400 and second hook 620 of slide 620 is a maximum distance. In various embodiments, in a fully extended position, second end 602 of slide 600 may be furthest from first end 401 of base 400. In various embodiments, a slide may be in a fully extended position when a slide stop (e.g., first slide stop 641, second slide stop 642) engages a portion of a base (e.g., first hinge portion 461) or a stop of a base (e.g., first stop 441, second stop 442).

Figure 9C:
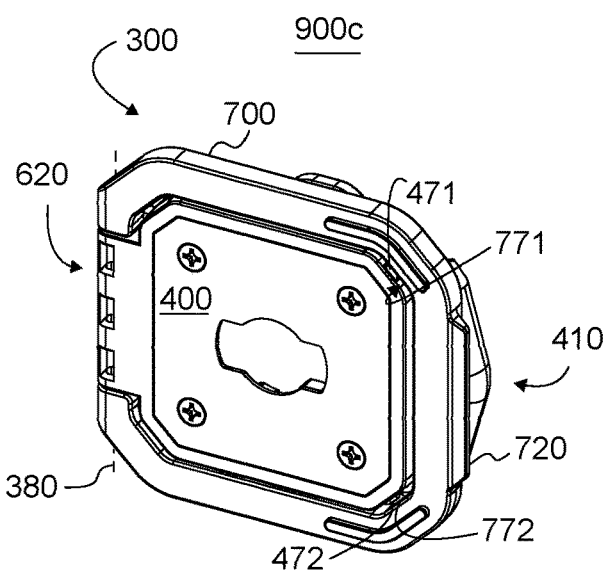
FIG. 9c is a front perspective view of an implementation of a front plate in a third configuration, according to one or more aspects herein.

As illustrated in FIG. 9c, front plate 300 is in a configuration 900c. In configuration 900c, front plate 300 may be in a fully contracted and locked position. In a fully contracted position, first slide end 601 of slide 600 may be proximate first base end 401 of base 400. In a fully contracted position, a distance between first hook 410 of base 400 and second hook 620 of slide 600 may be a minimum distance. In various embodiments, swing 700 may be in a locked position when one or more sets of teeth of slide 600 (e.g., first set of teeth 651 of slide 600, second set of teeth 652 of slide 600) are engaged with one or more sets of teeth of swing 700 (e.g., first set of teeth 751 of swing 700, second set of teeth 752 of swing 700). In various embodiments, swing 700 may be in a locked position when one or more latch features are engaged. For example, first latch feature 471 of base 400 may engage first latch feature 771 of swing 700 in the locked position. For example, second latch feature 472 of base 400 may engage second latch feature 772 of swing 700 in the locked position.

The example configurations shown in FIGS. 9a-9b only show a selection of configurations. A person of ordinary skill in the art will recognize that in an open configuration, there are infinite continuous positions swing 700 may occupy about axis of rotation 380, while there are infinite positions slide 600 may occupy about the axis of translation. However, in a locked position, there are only a discreet number of positions slide 600 may occupy relative to base 400, which are defined by the characteristics of set of teeth 651/652/65a/6b, such as size, number, pitch, shape, and/or the like.

Figure 10:
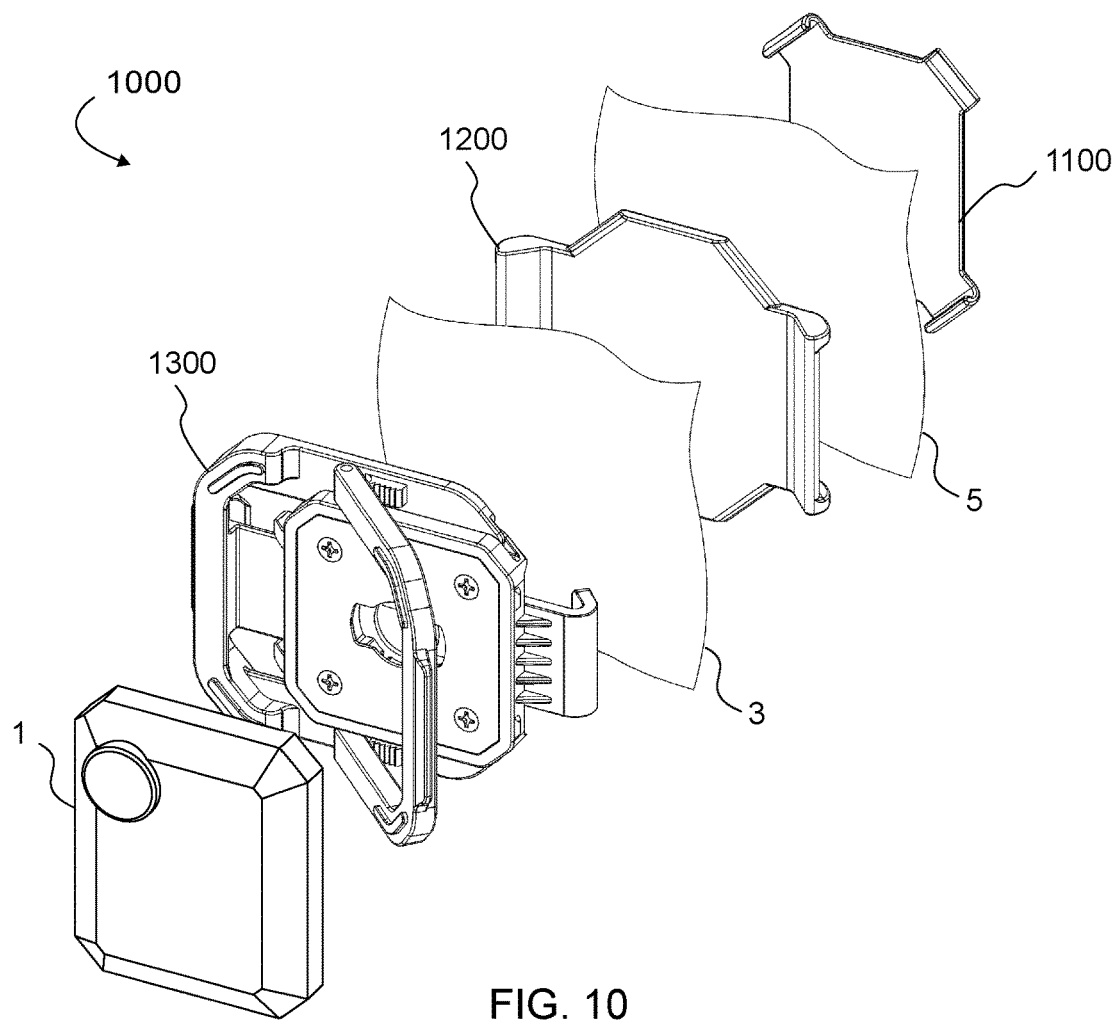
FIG. 10 is a front perspective view showing of another implementation of a mount, according to one or more aspects described herein.

FIG. 10 shows an exploded view of a mount 1000, which may be similar to, or share similar aspects or components with the mounts previously described herein. In various embodiments, a mount 1000 may include a front plate 1300, a back plate 1200, and an alignment clip 1100 (e.g., alignment plate). An alignment clip may be configured to align and releasably couple a back plate to an inner article of wear, such as an undershirt, t-shirt, and/or liner. Alignment clip 1100 may be configured to be positioned inside a second article of wear, such as second article of wear 5. In various embodiments, alignment clip 1100 may be used to releasably couple back plate 1200 to second article of wear 5 prior to coupling back plate 1200 with front plate 1300. In this manner, front plate 1300 may be decoupled from back plate 1200, and back plate 1200 may conveniently remain coupled to second article of wear 5.

Figure 11:
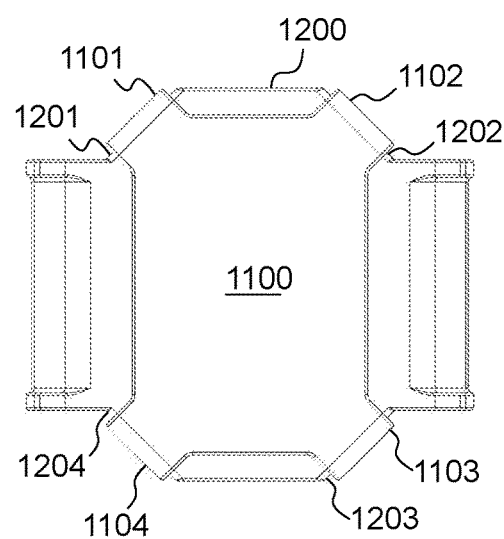
FIG. 11 is a rear view showing an implementation of an alignment clip coupled to a back plate, according to one or more aspects described herein.

FIG. 11 shows a rear view of an alignment clip 1100 coupled with a back plate 1200. Alignment clip 1100 and back plate 1200 may each be similar to, or share similar aspects or components with, the back plates and alignment clips previously described herein. While in various embodiments, an article of wear, such as article of wear 5 may be disposed between alignment clip 1100 and back plate 1200, the article of wear is hidden from view to illustrate a manner in which alignment clip 1100 may releasably engage back plate 1200 in accordance with various aspects described herein.

In various embodiments, back plate 1200 may comprise a plurality of edges configured to releasably engage one or more structures of alignment clip 1100. For example, back plate 1200 may comprise a plurality of edges (e.g., edges 1201, 1202, 1203, and 1204). Alignment clip 1100 may comprise a plurality of clasps (e.g., clasps 1101, 1102, 1103, and 1104). In various embodiments, clasps 1101-1104 may be shaped such that they overlap and grasp edges 1201-1204 of back plate 1200. In various embodiments, alignment clip 1100 may be configured to flex as clasps 1101-1104 engage edges 1201-1204 over an article of wear. While a plurality of clasps and edges are depicted in FIG. 11, other releasable coupling mechanisms may be used to fix a back plate to an inner article of wear such as magnets, snap fits, and interlocking ribs. Additionally, in some embodiments, alignment clip 1100 may comprise the plurality of edges, and back plate 1200 may comprise the plurality of clasps.

In various embodiments, a method for coupling a mount to an article of wear may comprise positioning a back plate adjacent a front plate, where the back plate comprises a first structure and a second structure, and where the front plate comprises a slide, a base, and a swing; sliding the slide relative to the base, where the slide comprises a fourth structure and a first coupler, and where the base comprises a third structure and a first latch feature; engaging the fourth structure with the first structure of the back plate and the third structure with the second structure of the back plate; rotating the swing to a locked position, where the swing comprises a second coupler and a second latch feature; engaging the second coupler of the swing with the first coupler of the slide to fix the slide in a position relative to the base; and engaging the second latch feature of the swing with the first latch feature of the base to secure the swing in the locked position. Implementations of this method may include where positioning the back plate adjacent the front plate comprises aligning a first engagement edge of the back plate with a second engagement edge of the front plate. Implementations of this method may further comprise coupling an accessory to the base of the front plate to prevent the first latch feature from disengaging the second latch feature.

Aspect of the disclosure relate to a mount. In a first example embodiment, a mount may comprise a back plate and a front plate. The back plate may comprise a first structure and a second structure, wherein the first structure opposes the second structure. The front plate may be configured to engage the back plate over an article of wear. The front plate may comprise a base configured to receive an accessory. The base may comprise a third structure. The front plate may comprise a slide slidably engaged with the base. The slide may comprise a fourth structure and a first coupler. The front plate may comprise a swing rotatably engaged with the base. The swing may comprise a second coupler. The slide may be configured to slide relative to the base to engage the first structure with the third structure and to engage the second structure with the fourth structure. The swing may be is configured to rotate about an axis of rotation to a locked position to engage the first coupler with the second coupler, thereby preventing translation of the slide relative to the base.

In a second example embodiment, a mount may comprise a back plate and a front place. The back plate may comprise a center portion. The back plate may comprise a first structure. The back plate may comprise a second structure. The center portion may connect the first structure and the second structure. The front plate may be configured to engage the back plate over an article of wear. The front plate may comprise a base configured to receive an accessory. The base may comprise a first latch feature. The base may comprise a third structure. The third structure may be configured to engage the first structure of the back plate. The front plate may comprise a slide. The slide may be slidably engaged with the base. The slide may comprise a fourth structure. The fourth structure may be configured to engage the second structure of the back plate. The front plate may comprise a swing rotatably engaged with the base. The swing may comprise a second latch feature. Rotating the swing in a first direction to a locked position may cause the swing to engage the slide in a position relative to the base. Rotating the swing in a first direction to a locked position may cause the first latch feature of the base to engage the second latch feature of the swing to secure the swing in the locked position.

A third example embodiment may include a mount of any one of the preceding example embodiments, further comprising a first coupler and a second coupler.

A fourth example embodiment may include a mount of any one of the preceding example embodiments, wherein the first coupler comprises a first set of teeth and the second coupler comprises a second set of teeth.

A fifth example embodiment may include a mount of any one of the preceding example embodiments, wherein the first set of teeth comprises a first rake angle and the second set of teeth comprises the first rake angle, and the first rake angle is greater than zero degrees, wherein engaging the first set of teeth with the second set of teeth in the locked position generates a compressive force between the first set of teeth and the second set of teeth; and a portion of the compressive force encourages the swing to remain in the locked position.

A sixth example embodiment may include a mount of any one of the preceding example embodiments, wherein one of the first set of teeth and second set of teeth comprise a recessed set of teeth.

A seventh example embodiment may include a mount of any one of the preceding example embodiments, wherein the base comprises a first latch feature and the swing comprises a second latch feature, and wherein the first latch feature is configured to engage the second latch feature in the locked position.

An eighth example embodiment may include a mount of any one of the preceding example embodiments, wherein the first structure comprises a first finger and the second structure comprise a second finger; and the third structure comprises a first hook and the fourth structure comprise a second hook; wherein an acute shape of the first hook is configured to interlock a obtuse shape of the first finger, and the acute shape of the second hook is configured to interlock the obtuse shape of the second finger.

A ninth example embodiment may include a mount of any one of the preceding example embodiments, wherein at least one of the first finger and the second finger comprises a first pair of engagement surfaces, wherein the first pair of engagement surfaces form a first engagement edge; and at least one of the third structure and the fourth structure comprises a second pair of engagement surfaces, wherein the second pair of engagement surfaces form a second engagement edge; wherein the second engagement edge is configured to cooperate with the first engagement edge to align the back plate with the front plate.

A tenth example embodiment may include a mount of any one of the preceding example embodiments, wherein the slide comprises a stop, and wherein the stop is configured to engage one of a portion of the swing and a portion of the base in a first translational direction to stop the slide from further translation in the first translational direction.

An eleventh example embodiment may include a mount of any one of the preceding example embodiments, wherein one of the first structure, the second structure, the third structure, and the fourth structure comprises a pair of shoulders; and the pair of shoulders of the one of the first structure, the second structure, the third structure, and the fourth structure is configured to cooperate with the other of the first structure, the second structure, the third structure and the fourth structure to align the back plate with the front plate.

A twelfth example embodiment may include a mount of any one of the preceding example embodiments, The mount of claim 1, wherein the base comprises one of a tongue and a groove and the slide comprises the other of the tongue and the groove, and wherein the tongue is configured to slidably engage the groove to constrain movement between the slide and the base to an axis of translation.

A thirteenth example embodiment may include a mount of any one of the preceding example embodiments, wherein the front plate further comprises one or more retainers coupled to a back surface of the base; a shape of the one or more retainers is configured to cooperate with the back surface of the base to form one or more grooves; and a portion of the slide is configured to slidably engage the one or more grooves.

A fourteenth example embodiment may include a mount of any one of the preceding example embodiments, wherein the slide comprises a stop, and wherein the stop is configured to engage one of a portion of the swing and a portion of the base in a first direction.

An fifteenth example embodiment may include a mount of any one of the preceding example embodiments, wherein the first structure and the second structure each comprise an obtuse shape; and the third structure and the fourth structure each comprise an acute shape; wherein the acute shape of the third structure is configured to interlock the obtuse shape of the first structure, and the acute shape of the fourth structure is configured to interlock the obtuse shape of the second structure.

An sixteenth example embodiment may include a mount of any one of the preceding example embodiments, wherein at least one of the first structure and the second structure comprises a first engagement edge; and at least one of the third structure and the fourth structure comprises a second engagement edge; wherein: the second engagement edge is configured to cooperate with the first engagement edge to align the back plate with the front plate.

An seventeenth example embodiment may include a mount of any one of the preceding example embodiments, wherein the slide further comprises a first set of teeth and the swing further comprises a second set of teeth, and wherein rotating the swing in the first direction to the locked position causes the second set of teeth of the swing to engage the first set of teeth of the slide.

An eighteenth example embodiment may include a mount of any one of the preceding example embodiments, wherein the base comprises one of a tongue and a groove and the slide comprises the other of the tongue and the groove, and wherein the tongue is configured to slidably engage the groove to constrain movement between the slide and the base to an axis of translation.

A nineteenth example embodiment may include a mount of any one of the preceding example embodiments, wherein a force required to disengage the swing from the locked position is greater than zero pounds force and less than ten pounds force.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". A person of ordinary skill in the art will appreciate that this disclosure includes any practical combination of the structures and methods disclosed. While for the sake of clarity of description several specifics embodiments of the invention have been described, the scope of the invention is intended to be measured by the claims as set forth below.

The words "herein", "hereunder", "above", "below", and other word that refer to a location, whether specific or general, in the specification shall refer to any location in the specification.

What is claimed is:

1. A mount comprising:
   a back plate, wherein the back plate comprises a first structure and a second structure, and wherein the first structure opposes the second structure; and
   a front plate configured to engage the back plate over an article of wear, wherein the front plate comprises:
     a base configured to receive an accessory, wherein the base comprises a third structure;
     a slide slidably engaged with the base, wherein the slide comprises a fourth structure and a first coupler;
     a swing rotatably engaged with the base, wherein the swing comprises a second coupler; wherein:
       the slide is configured to slide relative to the base to engage the first structure with the third structure and to engage the second structure with the fourth structure; and
       the swing is configured to rotate about an axis of rotation to a locked position to engage the first coupler with the second coupler, thereby preventing translation of the slide relative to the base.

2. The mount of claim 1, wherein the first coupler comprises a first set of teeth and the second coupler comprises a second set of teeth.

3. The mount of claim 2, wherein:
   the first set of teeth comprises a first rake angle and the second set of teeth comprises the first rake angle; and
   the first rake angle is greater than zero degrees; wherein:
     engaging the first set of teeth with the second set of teeth in the locked position generates a compressive force between the first set of teeth and the second set of teeth; and
     a portion of the compressive force encourages the swing to remain in the locked position.

4. The mount of claim 2, wherein one of the first set of teeth and second set of teeth comprise a recessed set of teeth.

5. The mount of claim 1, wherein the base comprises a first latch feature and the swing comprises a second latch feature, and wherein the first latch feature is configured to engage the second latch feature in the locked position.

6. The mount of claim 1, wherein:
   the first structure comprises a first finger and the second structure comprises a second finger; and
   the third structure comprises a first hook and the fourth structure comprises a second hook; wherein:
     an acute shape of the first hook is configured to interlock an obtuse shape of the first finger, and the acute shape of the second hook is configured to interlock the obtuse shape of the second finger.

7. The mount of claim 1, wherein:
   at least one of the first structure and the second structure comprises a first pair of engagement surfaces, wherein the first pair of engagement surfaces form a first edge; and
   at least one of the third structure and the fourth structure comprises a second pair of engagement surfaces, wherein the second pair of engagement surfaces form a second edge; wherein:
     the second edge is configured to cooperate with the first edge to align the back plate with the front plate.

8. The mount of claim 1, wherein the slide comprises a stop, and wherein the stop is configured to engage one of a portion of the swing and a portion of the base in a first translational direction to stop the slide from further translation in the first translational direction.

9. The mount of claim 1, wherein:
   one of the first structure, the second structure, the third structure, and the fourth structure comprises a pair of shoulders; and
   the pair of shoulders of the one of the first structure, the second structure, the third structure, and the fourth structure is configured to cooperate with the other of the first structure, the second structure, the third structure, and the fourth structure to align the back plate with the front plate.

10. The mount of claim 1, wherein the base comprises one of a tongue and a groove and the slide comprises the other of the tongue and the groove, and wherein the tongue is configured to slidably engage the groove to constrain movement between the slide and the base to an axis of translation.

11. The mount of claim 1, wherein:
    the front plate further comprises one or more retainers coupled to a back surface of the base;
    a shape of the one or more retainers is configured to cooperate with the back surface of the base to form one or more grooves; and
    a portion of the slide is configured to slidably engage the one or more grooves.

12. A mount comprising:
    a back plate, wherein the back plate comprises a center portion, a first structure, and a second structure, and wherein the center portion connects the first structure and the second structure;
    a front plate configured to engage the back plate over an article of wear, wherein the front plate comprises:

a base configured to receive an accessory, wherein the base comprises a first latch feature and a third structure, and wherein the third structure is configured to engage the first structure of the back plate;

a slide slidably engaged with the base, wherein the slide comprises a fourth structure, and wherein the fourth structure is configured to engage the second structure of the back plate; and a swing rotatably engaged with the base, wherein the swing comprises a second latch feature; wherein:

rotating the swing in a first direction to a locked position causes the swing to engage the slide in a position relative to the base, and causes the first latch feature of the base to engage the second latch feature of the swing to secure the swing in the locked position.

13. The mount of claim 12, wherein the slide comprises a stop, and wherein the stop is configured to engage one of a portion of the swing and a portion of the base in a first direction.

14. The mount of claim 12, wherein:
the first structure and the second structure each comprise an obtuse shape; and
the third structure and the fourth structure each comprise an acute shape; wherein:
the acute shape of the third structure is configured to interlock the obtuse shape of the first structure, and the acute shape of the fourth structure is configured to interlock the obtuse shape of the second structure.

15. The mount of claim 12, wherein:
at least one of the first structure and the second structure comprises a first engagement edge; and
at least one of the third structure and the fourth structure comprises a second engagement edge; wherein:
the second engagement edge is configured to cooperate with the first engagement edge to align the back plate with the front plate.

16. The mount of claim 12 wherein:
the slide further comprises a first set of teeth and the swing further comprises a second set of teeth, and wherein rotating the swing in the first direction to the locked position causes the second set of teeth of the swing to engage the first set of teeth of the slide.

17. The mount of claim 12 wherein the base comprises one of a tongue and a groove and the slide comprises the other of the tongue and the groove, and wherein the tongue is configured to slidably engage the groove to constrain movement between the slide and the base to an axis of translation.

18. The mount of claim 12, wherein a force required to disengage the swing from the locked position is greater than zero pounds force and less than ten pounds force.

19. The mount of claim 16, wherein:
the first set of teeth comprises a first rake angle and the second set of teeth comprises the first rake angle; and
the first rake angle is greater than zero degrees; wherein:
engaging the first set of teeth with the second set of teeth in the locked position generates a compressive force between the first set of teeth and the second set of teeth; and
a portion of the compressive force encourages the swing to remain in the locked position.

20. The mount of claim 12, wherein the front plate further comprises one or more retainers coupled to a back surface of the base;
a shape of the one or more retainers is configured to cooperate with the back surface of the base to form one or more grooves; and
a portion of the slide is configured to slidably engage the one or more grooves.

* * * * *